US008953825B2

(12) United States Patent
Lim et al.

(10) Patent No.: US 8,953,825 B2
(45) Date of Patent: Feb. 10, 2015

(54) DISPLAY APPARATUS AND CONTROL METHOD THEREOF

(75) Inventors: Soo-chan Lim, Suwon-si (KR); Sung-woo Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 284 days.

(21) Appl. No.: 12/972,861

(22) Filed: Dec. 20, 2010

(65) Prior Publication Data

US 2011/0211121 A1 Sep. 1, 2011

(30) Foreign Application Priority Data

Feb. 26, 2010 (KR) ........................ 10-2010-0017546

(51) Int. Cl.

*H04N 9/74* (2006.01)
*H04R 3/04* (2006.01)
*G09G 5/00* (2006.01)

(52) U.S. Cl.

CPC .............. *H04R 3/04* (2013.01); *H04R 2400/00* (2013.01); *H04R 2499/15* (2013.01)
USPC .......................................................... 381/306

(58) Field of Classification Search

CPC ......... H04N 5/642; H04N 5/64; G06F 1/1601
USPC ......... 381/306, 59, 56, 58, 304, 303, 308, 98, 381/101–103; 348/578; 345/156; 700/94
See application file for complete search history.

(56) References Cited

U.S. PATENT DOCUMENTS

| | | | | |
|---|---|---|---|---|
| 5,910,990 | A | 6/1999 | Jang | |
| 6,169,806 | B1 * | 1/2001 | Kimura et al. | 381/17 |
| 6,219,228 | B1 * | 4/2001 | Sun | 361/679.21 |
| 6,268,998 | B1 * | 7/2001 | Cho | 361/679.23 |
| 6,411,271 | B1 * | 6/2002 | Bang et al. | 345/87 |
| 6,801,628 | B1 | 10/2004 | Thiel | |
| 6,997,525 | B2 * | 2/2006 | Gillengerten | 312/7.2 |
| 7,270,423 | B2 * | 9/2007 | Katase | 353/79 |
| 8,175,285 | B2 * | 5/2012 | Suzuki | 381/61 |
| 8,401,202 | B2 * | 3/2013 | Brooking | 381/59 |

(Continued)

FOREIGN PATENT DOCUMENTS

KR 10-2009-0027101 A 3/2009

OTHER PUBLICATIONS

Communication dated Jun. 6, 2011 from the European Patent Office in counterpart application No. 11151251.3.

(Continued)

*Primary Examiner* — Vivian Chin
*Assistant Examiner* — Leonard M Giannone
(74) *Attorney, Agent, or Firm* — Sughrue Mion, PLLC

(57) ABSTRACT

A display apparatus including a speaker and a control method thereof which controls the speaker to output a sound wave adjusted according to an installation condition of the display apparatus. The display apparatus includes a signal processor which processes an image signal and an audio signal; a display unit which displays an image corresponding to the image signal processed by the signal processor; a speaker which outputs a sound wave corresponding to the audio signal processed by the signal processor; and a controller which controls the signal processor to adjust the sound wave corresponding to the audio signal to an adjustment value according to an installation condition of the display apparatus.

19 Claims, 11 Drawing Sheets

(56) References Cited

U.S. PATENT DOCUMENTS

| | | | | |
|---|---|---|---|---|
| 2004/0218765 | A1* | 11/2004 | Thiel | 381/56 |
| 2005/0141725 | A1 | 6/2005 | Kim | |
| 2005/0146251 | A1* | 7/2005 | Gillengerten | 312/8.16 |
| 2006/0008103 | A1* | 1/2006 | Takahashi et al. | 381/333 |
| 2006/0072003 | A1* | 4/2006 | Kawase | 348/14.01 |
| 2006/0149401 | A1* | 7/2006 | Chung | 700/94 |
| 2006/0149402 | A1* | 7/2006 | Chung | 700/94 |
| 2006/0161282 | A1* | 7/2006 | Chung | 700/94 |
| 2006/0161964 | A1* | 7/2006 | Chung | 725/141 |
| 2006/0288139 | A1* | 12/2006 | Lee et al. | 710/62 |
| 2006/0291149 | A1* | 12/2006 | Suzuki et al. | 361/679 |
| 2007/0047187 | A1* | 3/2007 | Kumano et al. | 361/681 |
| 2007/0246627 | A1* | 10/2007 | Morita | 248/289.11 |
| 2007/0273790 | A1* | 11/2007 | Sakata et al. | 348/552 |
| 2008/0062099 | A1* | 3/2008 | Oshima | 345/87 |
| 2008/0285779 | A1 | 11/2008 | Naito | |
| 2009/0067664 | A1* | 3/2009 | Lim | 381/388 |
| 2009/0196440 | A1* | 8/2009 | Suzuki | 381/160 |
| 2009/0225996 | A1* | 9/2009 | Brooking | 381/59 |
| 2009/0324002 | A1* | 12/2009 | Richardson | 381/388 |

OTHER PUBLICATIONS

Communication dated Mar. 18, 2013 from the Korean Intellectual Property Office in a counterpart application No. 10-2010-0017546.
Communication dated Sep. 2, 2013 issued by the Korean Intellectual Property Office in counterpart Korean Patent Application No. 10-2010-0017546.
Communication dated Nov. 25, 2013 issued by the Korean Intellectual Property Office in counterpart Korean Patent Application No. 10-2013-0136357.

* cited by examiner

DISPLAY APPARATUS AND CONTROL METHOD THEREOF

CROSS-REFERENCE TO RELATED APPLICATION

This application claims priority from Korean Patent Application No. 10-2010-0017546, filed on Feb. 26, 2010 in the Korean Intellectual Property Office, the disclosure of which is incorporated herein by reference.

BACKGROUND

1. Field

Apparatuses and methods consistent with the exemplary embodiments relate to a display apparatus and a control method thereof, and more particularly, to a display apparatus including a speaker and a control method thereof which controls the speaker to output a sound wave adjusted according to an installation condition of the display apparatus.

2. Description of the Related Art

With advances in technology, display apparatuses are becoming slimmer. To be slimmer, a speaker is generally disposed in a rear side of the display apparatus. Depending on an installation location of the display apparatus, i.e., depending on whether a wall-mounted or desktop display apparatus, a sound wave output by the speaker which is provided in the rear side of the display apparatus may be deteriorated in sound quality.

SUMMARY

One or more exemplary embodiments provide a display apparatus and a control method thereof which prevent a deterioration of sound quality depending on an installation condition of the display apparatus.

According to an aspect of an exemplary embodiment, there is provided a display apparatus including a signal processor which processes an received image signal and an audio signal; a display unit which displays an image corresponding to the image signal processed by the signal processor; a speaker which outputs a sound wave corresponding to the audio signal processed by the signal processor; and a controller which controls the signal processor to adjust the sound wave corresponding to the audio signal to an adjustment value according to an installation condition of the display apparatus.

The display apparatus may further include a storage unit which stores the adjustment value.

The signal processor may further include a frequency adjuster which adjusts a frequency of the audio signal based on the adjustment value stored in the storage unit.

The controller may control the signal processor to adjust a frequency of the audio signal based on the adjustment value stored in the storage unit.

The controller may control the signal processor to adjust the sound wave to the adjustment value if a signal corresponding to the installation condition of the display apparatus is received through an user input unit.

The display apparatus may further include a user interface (UI) generator which generates a UI to display the installation condition of the display apparatus, wherein the controller controls the UI generator to display the UI on the display unit, and controls the signal processor to adjust the sound wave to the adjustment value according to a selection from the displayed UI received through a user input unit.

The display apparatus may further include a rear side cover which accommodates the display unit therein.

The receiver, signal processor, speaker and controller may be provided in a rear side of the display unit, and accommodated by the rear side cover.

The display apparatus may further include a supporting casing which accommodates therein the signal processor, the speaker and the controller separately from the display unit.

The display apparatus may further include a supporter which is supported by the supporting casing and adhered to at least one of the rear side cover and display unit to install the display apparatus on a horizontal surface, and electrically connects the supporting casing and the display unit through the supporter.

The supporting casing may be detachably connected to an external side of the rear side cover and electrically connected to the display unit to install the desktop display apparatus.

The supporting casing may further include a supporting connector which is exposed and formed from the external side of the supporting casing and electrically connected to the display unit, and the display unit further includes a display connector which is exposed and formed from an external side of the display unit and connected to the supporting connector.

The display apparatus may further include a supporter which is supported by the supporting casing and attached to the display unit, and the supporter further includes a connector which connects the supporting connector and the display connector.

The controller may determine whether the supporting connector is directly connected to the display connector or connected to the display connector through the connector and confirms the installation condition of the display apparatus.

A high signal may be applied to the controller if the supporting connector is directly connected to the display connector, and the controller confirms that the display apparatus is installed on a vertical surface.

A low signal may be applied to the controller if the supporting connector is connected to the display connector through the connector, and the controller confirms that the display apparatus is installed on a horizontal surface.

According to an aspect of another exemplary embodiment, there is provided a control method of a display apparatus which is installed in a desktop or a wall-mounted type, the control method including receiving an image signal and an audio signal; determining an installation condition of the display apparatus; and processing the received audio signal according to the determined installation condition; and outputting a sound wave corresponding to the processed audio signal.

The control method may further include the processing the received audio signal comprising adjusting the sound wave corresponding to the audio signal to an adjustment value according to the installation condition of the display apparatus, wherein the adjustment value is prestored in the display apparatus.

The determining the installation condition of the display apparatus may include confirming reception of a signal corresponding to the installation condition of the display apparatus through a user input unit.

The control method may further include generating a UI to display the installation condition of the display apparatus, wherein the determining the installation condition of the display apparatus includes confirming a selection from the displayed UI which is received through a user input unit.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Figure 1:
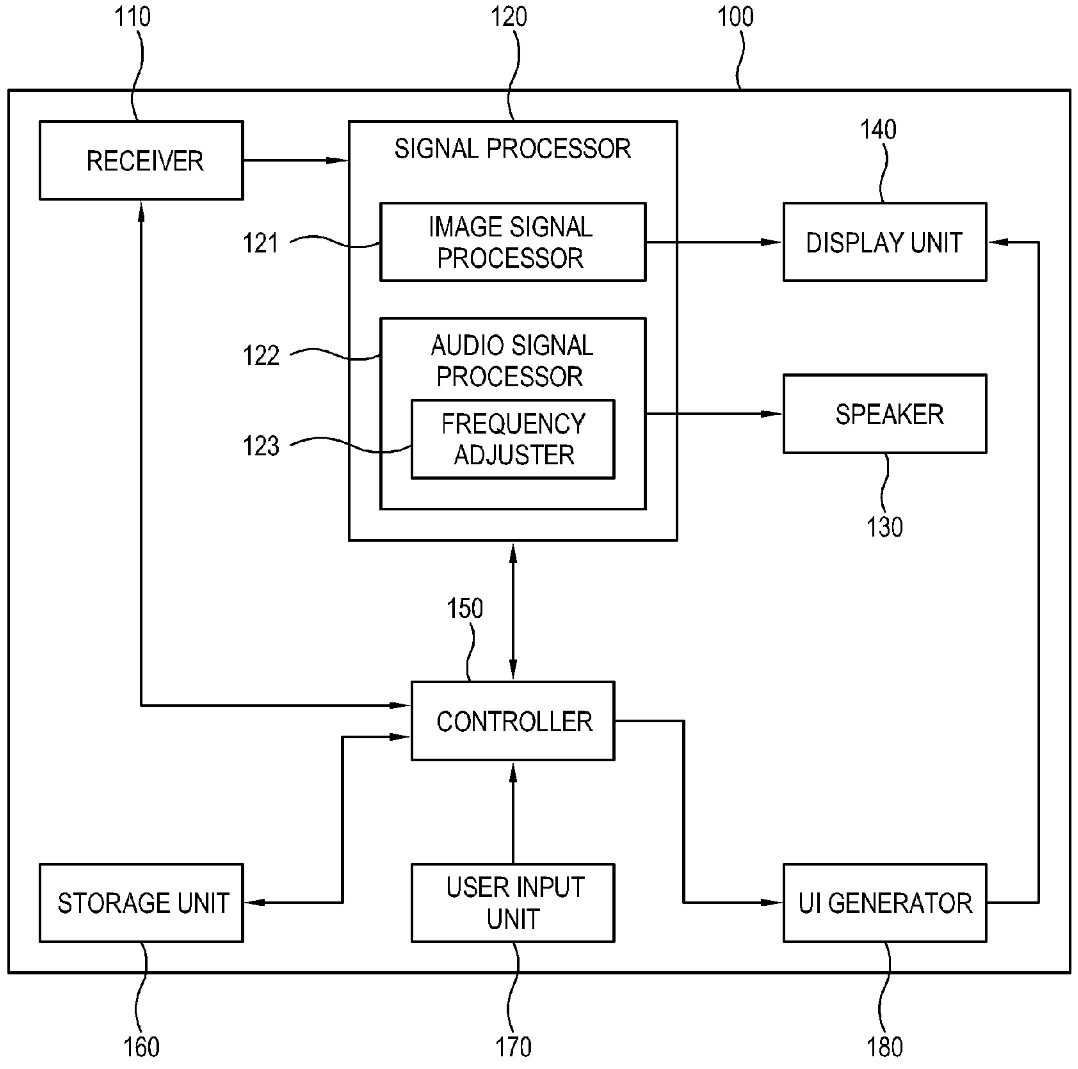
FIG. 1 is a control block diagram of a display apparatus according to an exemplary embodiment.

Below, exemplary embodiments will be described in detail with reference to accompanying drawings so as to be easily realized by a person having ordinary knowledge in the art. The present inventive concept may be embodied in various forms without being limited to the exemplary embodiments set forth herein. Descriptions of well-known parts are omitted for clarity, and like reference numerals refer to like elements throughout.

FIG. 1 is a control block diagram of a display apparatus 100 according to an exemplary embodiment.

As shown therein, the display apparatus 100 according to the exemplary embodiment includes a receiver 110, a signal processor 120, a speaker 130, a controller 150, a display unit 140, a storage unit 160, a user input unit 170 and a user interface (UI) generator 180.

The receiver 110 may receive an image signal and/or an audio signal from an external source. The receiver 110 may include a tuner (not shown) to receive a broadcasting signal from a broadcasting transmission device. The receiver 110 may further include an external signal receiver (not shown) to receive an image and/or audio signal from an external device such as a digital versatile disk (DVD) and/or Blu-ray disc (BD) player, a PC, a game console, a personal video recorder (PVR), a set-top box (STB) or a server.

The signal processor 120 may process an image signal and/or audio signal received through the receiver 110. An image corresponding to the processed image signal may be displayed on the display unit 140 (to be described later), and a sound wave corresponding to the processed audio signal may be output by the speaker 130 (to be described later).

The signal processor 120 may further include an image signal processor 121 to process the image signal. The image signal processor 121 may include a scaler (not shown) to output a scaled image signal by adjusting a vertical frequency, resolution, a picture ratio corresponding to a resolution of the display unit 140; an analog-to-digital (A/D) converter (not shown) which converts an analog image signal received through the receiver 110 into a digital image signal; a decoder (not shown) which decodes the digital image signal; and/or a format converter (not shown) which converts a format of the image signal.

The signal processor 120 may further include an audio signal processor 122 which processes the received audio signal. The audio signal processor 122 may further include an A/D converter (not shown) which converts an analog audio signal received through the receiver 110 into a digital audio signal; an audio amplifier (not shown) which amplifies the received audio signal; a level adjuster (not shown) which adjusts an output level of the audio signal; and/or a frequency adjuster 123 which adjusts a frequency of the audio signal.

The frequency adjuster 123 adjusts a deformation of an audio signal which may occur during the conversion and/or amplification process. The frequency adjuster 123 may be provided in the audio amplifier.

The frequency adjuster 123 may include an equalizer, for example, a parametric equalizer which changes a frequency of an audio signal at 5 band or more. The parametric equalizer may have high frequency filtering, howling removing, and tone controlling functions and/or articulation enhancing function.

The frequency adjuster 123 may adjust a frequency of the sound wave to a preset adjustment value stored in the storage unit 160 (to be described later) by a control of the controller 150 (to be described later).

The speaker 130 may output a sound wave corresponding to the audio signal processed by the audio signal processor 122. That is, the speaker 130 vibrates the air with a diaphragm provided therein with respect to the received audio signal and forms and outputs the sound wave. The speaker 130 may further include a woofer speaker (not shown).

The display unit 140 may display thereon an image corresponding to the image signal processed by the signal processor 120. The display unit 140 includes a display panel 141 to display the image thereon. The display panel 141 may include a liquid crystal display (LCD) panel including a liquid crystal layer, an organic light emitting diode (OLED) display panel including an organic light emitting layer, or a plasma display panel (PDP).

The controller 150 may control the signal processor to output the sound wave adjusted to the preset adjustment value through the speaker 130 corresponding to the audio signal according to the installation condition of the display apparatus 100.

The display apparatus 100 according to the exemplary embodiment may be a wall-mounted type to be mounted on a vertical surface such as a wall or a desktop type to be placed on a horizontal surface such as a floor or a desk.

Generally, the speaker 130 vibrates the air with a diaphragm with respect to the audio signal received from the audio signal processor 122 and forms and outputs a sound wave. The speaker 130 is generally installed in a rear side of the display apparatus 100. Depending on whether the display apparatus 100 is installed as a wall-mounted type or a desktop type, the sound wave output by the speaker 130 may be different in deterioration due to reinforcement or offset of the sound wave.

Accordingly, the controller 150 may determine the installation condition of the display apparatus 100, and control the signal processor 120 to adjust the sound wave to the preset adjustment value according to the determined installation condition depending and output the adjusted sound wave through the speaker 130 to thereby prevent the deterioration of the sound quality.

The storage unit 160 may store therein the preset adjustment value to which the sound wave is adjusted corresponding to the installation condition of the display apparatus 100. The storage unit 160 may be a non-volatile memory such as a read-only memory (ROM), a programmable read-only memory (PROM) or a flash memory. The controller 150 may control the signal processor 120 to adjust the frequency of the audio signal based on the adjustment value stored in the storage unit 160.

A user's selection may be input through user input unit 170. The user input unit 170 may include a button of the display unit 140, a touch panel provided in the display panel of the display unit 140, or a keyboard or remote controller connected in a wired/wireless manner or other various means as long as they are operable receive a user's selection.

If a signal corresponding to the installation condition of the display apparatus 100 is received through the user input unit 170, the controller 150 may control the signal processor 120 to adjust the sound wave to the preset adjustment value and output the adjusted sound wave through the speaker 130.

If a particular key of the user input unit 170 is actuated, it may be assumed that the signal corresponding to the installation condition of the display apparatus 100 is received.

The UI generator 180 may generate a UI to display the installation condition of the display apparatus 100. The UI may display the type of the display apparatus, i.e., the wall-mounted or desktop type. If the preset signal is received through the user input unit 170, the controller 150 controls the UI generator 180 to display the UI on the display unit 140 and controls the signal processor 120 to adjust the sound wave into the adjustment value and output the adjusted sound wave through the speaker 130 corresponding to the user's selection from the displayed UI received through the user input unit 170.

Figure 2:
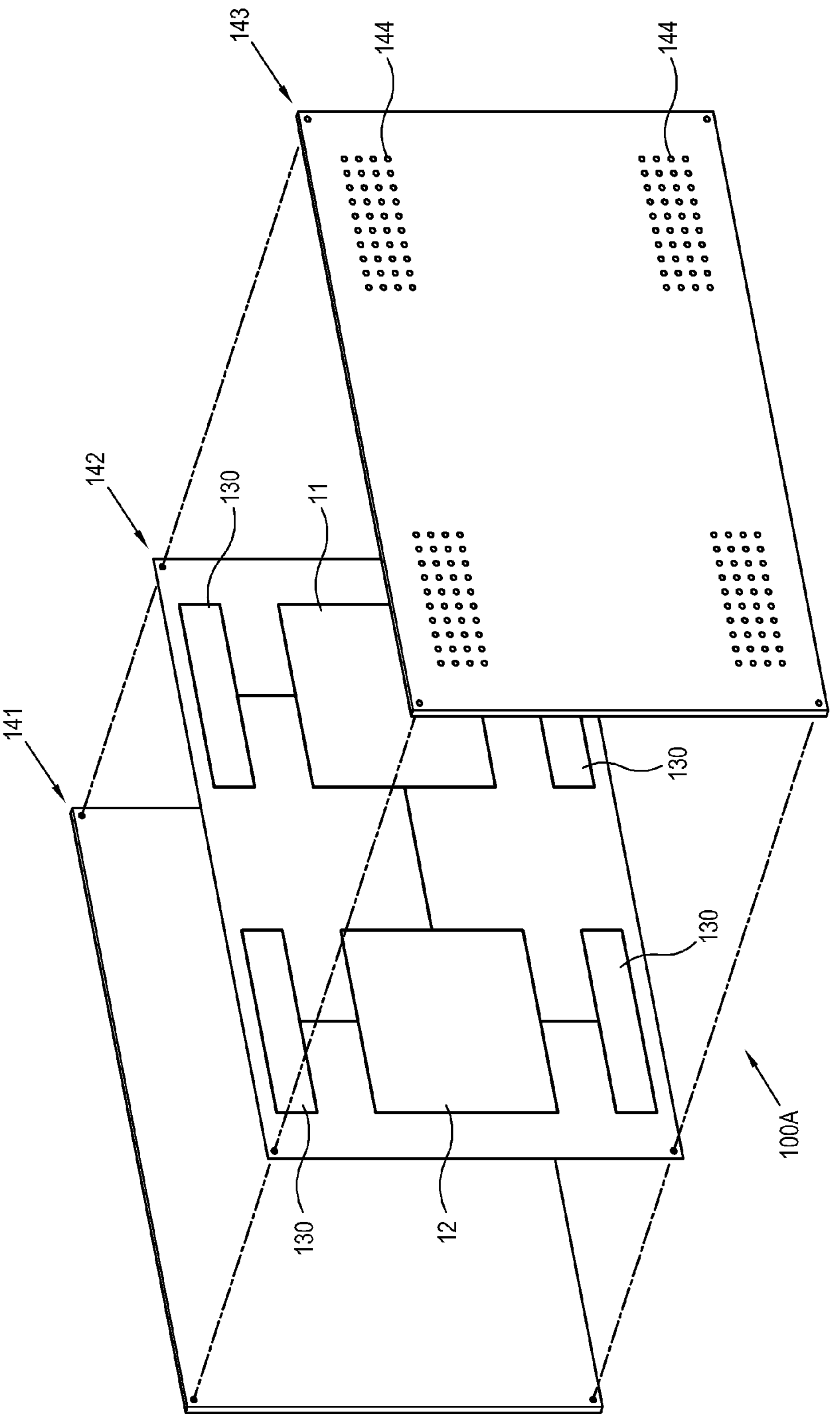
FIG. 2 illustrates a display apparatus according to a first exemplary embodiment.

FIG. 2 illustrates a display apparatus 100A according to a first exemplary embodiment.

As shown therein, the display unit 140 of the display apparatus 100A according to the first exemplary embodiment includes a display panel 141 displaying an image thereon and a rear chassis 142 including a panel driving board 12. The display apparatus 100 may include a rear side cover 143 to accommodate the display unit 140 therein.

The panel driving board 12 may include a timing controller (not shown) to control a time difference occurring when an image corresponding to an image signal received from the signal processor 120 is displayed on the display panel 141.

The rear chassis 142 may accommodate a main board 11 including the receiver 110, the signal processor 120, the controller 150, the storage unit 160 and the UI generator 170, and the speaker 130. The receiver 110, the signal processor 120, the controller 150, the storage unit 160 and the UI generator 170 may be provided in the rear side of the display unit 140 and accommodated in the rear side cover 143.

The rear side cover 143 may accommodate the display unit 140 and include through holes 144 to output the sound wave from the speaker 130 to the outside.

The display apparatus 100A according to the first exemplary embodiment may further include a wall mounting unit (not shown) to be mounted in the wall.

The display apparatus 100A according to the first exemplary embodiment may further include a stand unit to be installed on a desk. The stand unit may include a desktop casing to support the display apparatus 100A and a stand part to be adhered to the rear side cover 143 of the display apparatus 100A.

If the display apparatus 100A is installed a wall-mounted display apparatus, the sound wave output from the speaker 130 may be deteriorated. If the display apparatus 100 is installed as a desktop display apparatus, the sound wave may be deteriorated depending on the proximity to the wall. The wall-mounted display apparatus may have more serious sound wave deterioration than the desktop display apparatus.

The controller 150 may determine the installation condition of the display apparatus 100A and control the signal processor 120 to adjust the sound wave into the preset adjustment value and output the adjusted sound wave through the speaker 130 corresponding to the audio signal according to the installation condition.

The controller 150 may determine the installation condition of the display apparatus 100A as follows.

If a signal corresponding to the installation condition of the display apparatus 100 is received by an input of a particular key through the user input unit 170, the controller 150 may determine the installation condition of the display apparatus 100 through the signal.

If a preset signal is received through the user input unit 170, the controller 150 may control the UI generator 180 to generate a UI displaying the installation condition of the display apparatus 100A and displayed on the display unit 140. If the signal corresponding to a user's selection from the displayed UI is received through the user input unit 170, the controller 150 may determine the installation condition of the display apparatus 100 through the signal.

The display apparatus 100A may further include a proximity sensor (not shown).

If the display apparatus 100A is placed toward the wall, the proximity sensor may sense the proximity of the display apparatus 100A to the wall. A particular distance between the display apparatus 100 and the wall may be preset as a default, and the proximity of the display apparatus 100 may be determined on the basis of the preset default.

If the proximity sensor senses that the display apparatus 100A is adjacent to the wall at a distance less than or equal to the preset default, the signal is applied to the controller 150. Then, the controller 150 may control the signal processor 120 to adjust the sound wave corresponding to the audio signal to the preset adjustment value stored for the case in that the wall-mounted display apparatus is installed and output the adjusted sound wave through the speaker 130.

If the proximity sensor senses that the display apparatus 100 is adjacent to the wall at distance greater than the preset default scope, the signal is applied to the controller 150. Then, the controller 150 may control the signal processor 120 to adjust the sound wave corresponding to the audio signal to the preset adjustment value stored for the case in that the desktop display apparatus 100 is installed and output the adjusted sound wave through the speaker 130.

Figure 3:
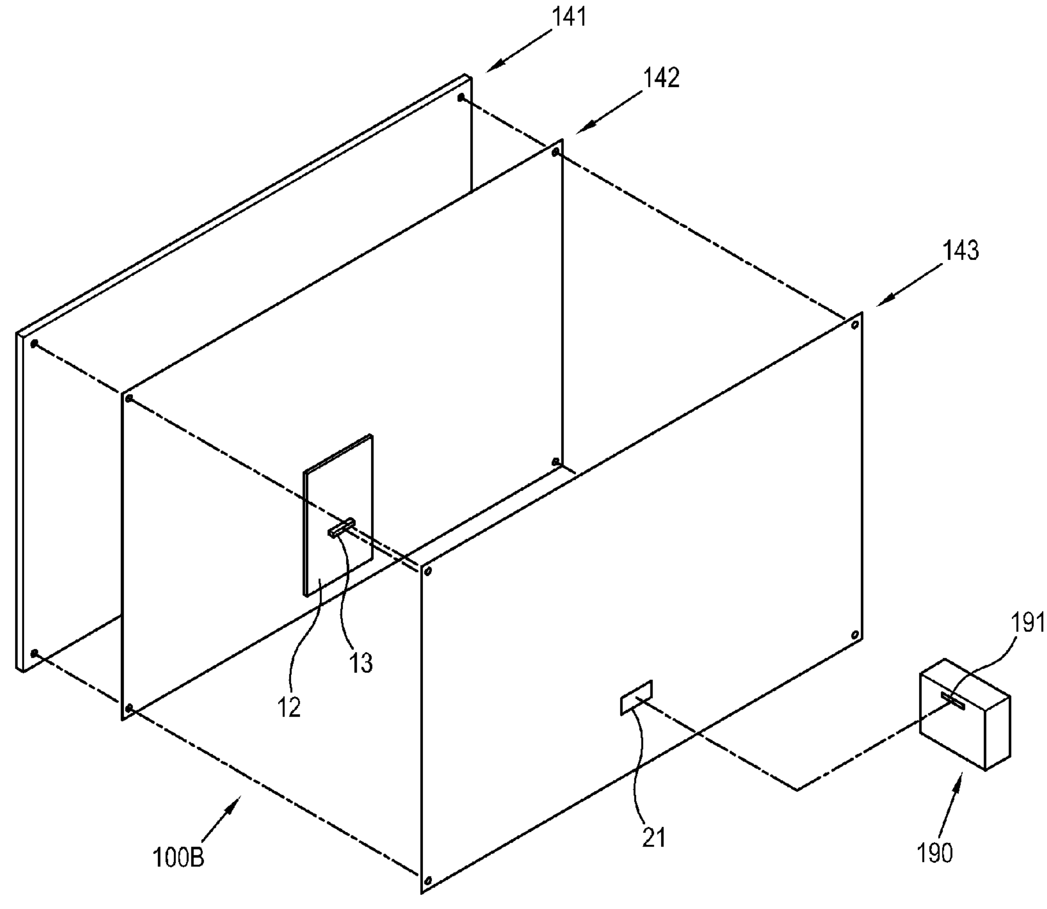
FIGS. 3 to 5 illustrate a display apparatus according to a second exemplary embodiment.
Figure 4:
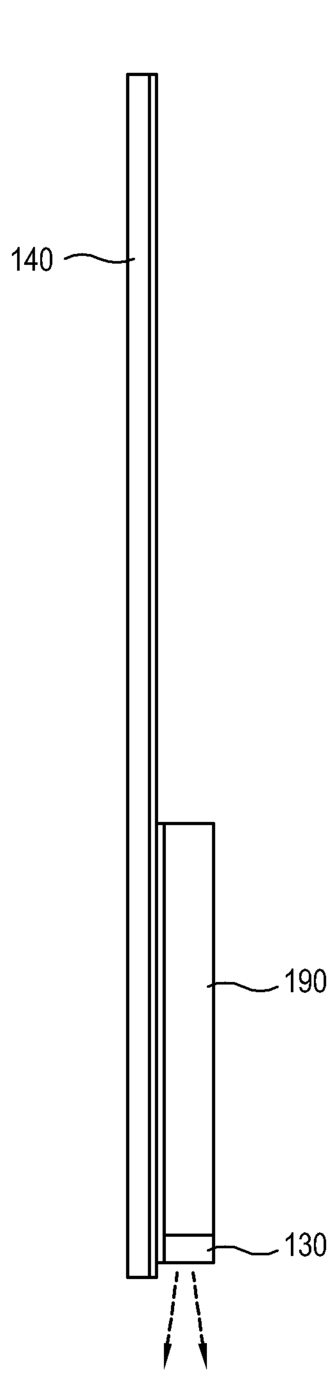
Figure 5:
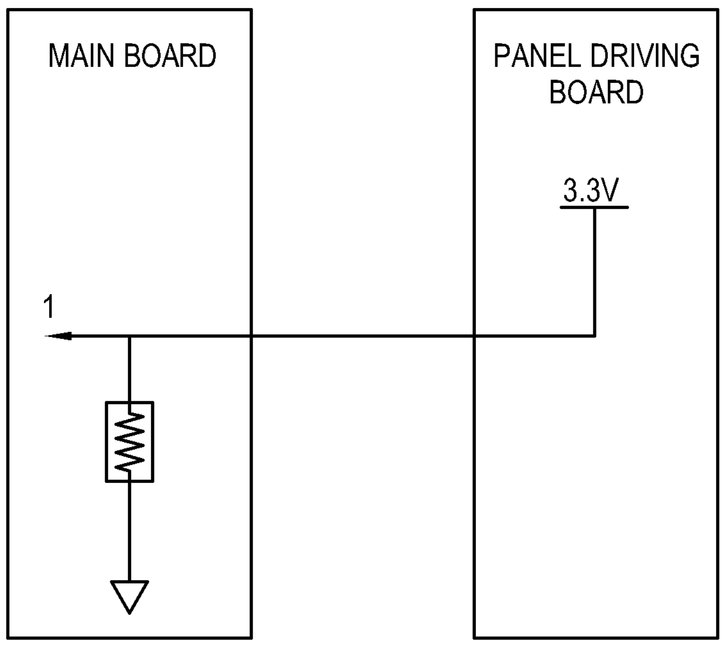

FIGS. 3 to 5 illustrate a display apparatus 100B according to a second exemplary embodiment.

As shown in FIG. 3, the display apparatus 100B according to the present exemplary embodiment may further include a supporting casing 190 which accommodates therein the receiver 110, the signal processor 120, the speaker 130 and the controller 150 separately from the display unit 140.

The display unit 140 includes the display panel 141 and the rear chassis 142 having the panel driving board 12. The display panel 141 and the rear chassis 142 having the panel driving board 12 are accommodated in the rear side cover 143.

The display unit 140 may further include a display connector 13 to be connected to the supporting casing 190. The display connector 13 may be formed on the panel driving board 12. A slot 21 may be formed in the rear side cover 143 to expose the display connector 13 to the outside of the display unit 140.

The supporting casing 190 is shaped like a rectangle having a predetermined height, but not limited thereto. Alternatively, the supporting casing 190 may have a circular, oval or polygonal shape. The receiver 110, the signal processor 120, the speaker 130 and the controller 150 may be provided in the main board, which is accommodated in the supporting casing 190.

The speaker 130 may be mounted in a front area of the supporting casing 190 to discharge the sound wave forward. Alternatively, the speaker 130 may be provided in other various areas including the rear side or left or right side of the supporting casing 190.

To mount the display apparatus 100B to a wall, the supporting casing 190 may be detachably attached to the external side of the rear side cover 143. The supporting casing 190 may electrically be connected to the display apparatus 100.

The supporting casing 190 may further include a supporting connector 191 which is exposed from the external side of the supporting casing 190 and electrically connected to the display unit 140.

The supporting connector 191 may be directly connected to the display connector 13 to have the supporting casing 190 provided in the rear side of the display unit 140.

The supporting connector 191 may be formed in the main board 11 and exposed to the outside of the supporting casing 190.

Accordingly, the supporting connector 191 is electrically connected to the display connector 13 and transmits an image/audio signal and a control signal to the display unit 140 from the main board 11 accommodated in the supporting casing 190.

There may occur an error in physical contact between the supporting connector 191 and the display connector 13. In such case, the display apparatus 100 according to the present exemplary embodiment may further include a circuit to shut down power supply to thereby prevent malfunction of the display apparatus 100 or damage to circuit components.

The supporting casing 190 is installed in the rear side of the display unit 140 as in FIG. 4.

If the supporting casing 190 is coupled to the rear side of the display unit 140 as in FIG. 4, the speaker 130 may be provided in a lower part of the supporting casing 190. In such case, a movement direction of the sound wave output by the speaker 130 may be the same as the direction of the arrow in FIG. 4. Then, the sound wave moves downwards and may cause deterioration of sound quality.

The controller 150 may control the signal processor 120 to adjust the sound wave to the adjustment value stored in the storage unit 160 for the display apparatus 100B mounted to the wall and output the adjusted sound wave. Then, the deterioration of sound quality does not occur and the speaker 130 may output the sound which is close to the original sound.

FIG. 5 is a circuit diagram of the display apparatus 100B when the supporting casing 190 is directly connected to the display unit 140.

The controller 150 which is accommodated in the supporting casing 190 may automatically determine the installation condition of the display apparatus 100B.

The supporting connector 191 which is provided in the main board 11 accommodated in the supporting casing 190 and the display connector 13 which is provided in the panel driving board 12 included in the display unit 140 include a pin (not shown) to determine the installation condition of the display apparatus 100B, respectively.

If the supporting connector 191 is directly connected to the display connector 13, as in FIG. 5, a reference voltage (3.3V) flows from the panel driving board 12 to the supporting connector 191 through the pin provided to determine the installation condition, and a high signal is applied to the controller 150. The controller 150 which receives the high signal may confirm that the display apparatus 100B is installed on a vertical surface. The controller 150 may control the signal processor 120 to adjust the audio signal into the preset adjustment value stored in the storage unit 160 for the wall-mounted display apparatus 100B and output the adjusted audio signal through the speaker 130.

Figure 6:
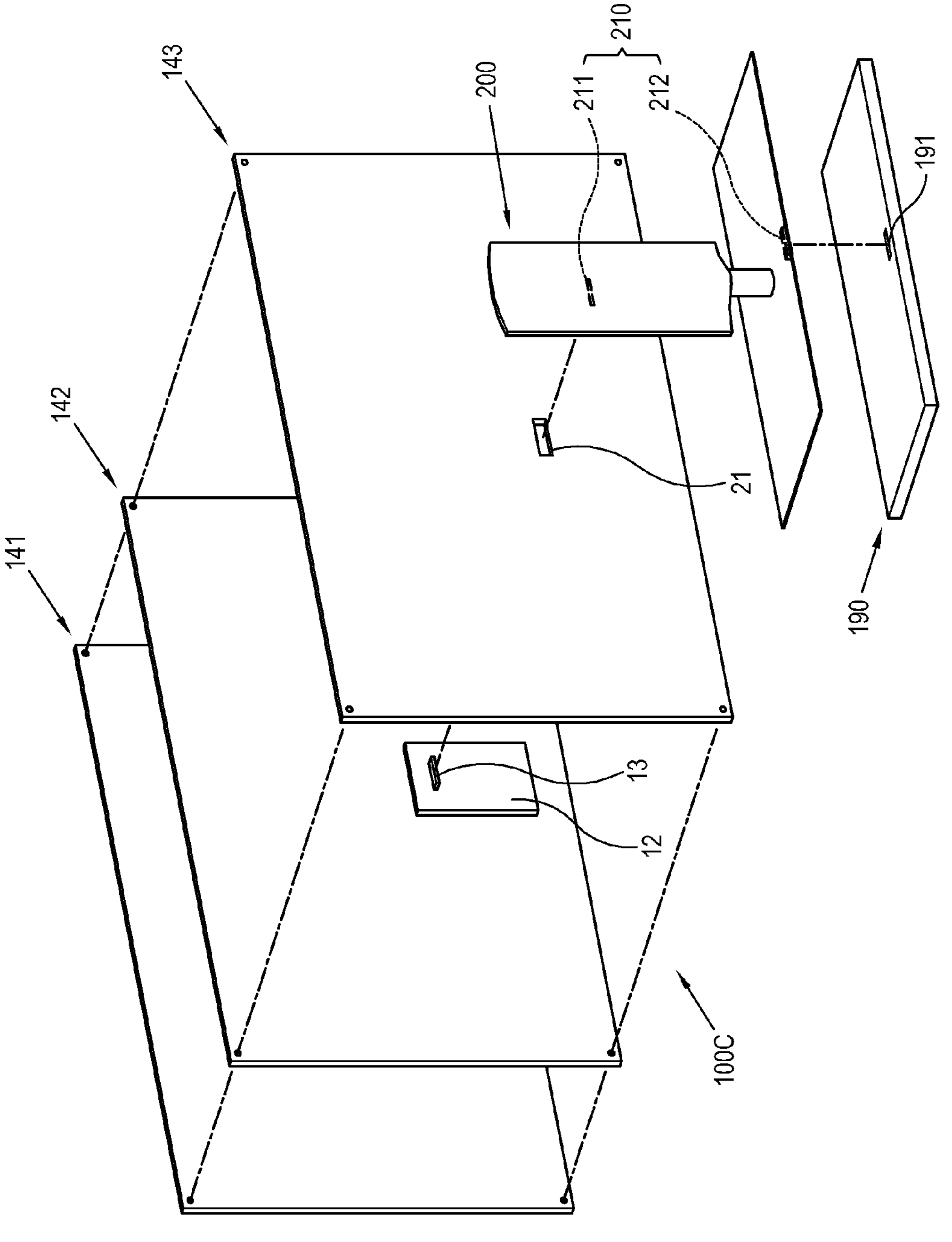
FIGS. 6 to 8 illustrate a display apparatus according to a third exemplary embodiment.
Figure 7:
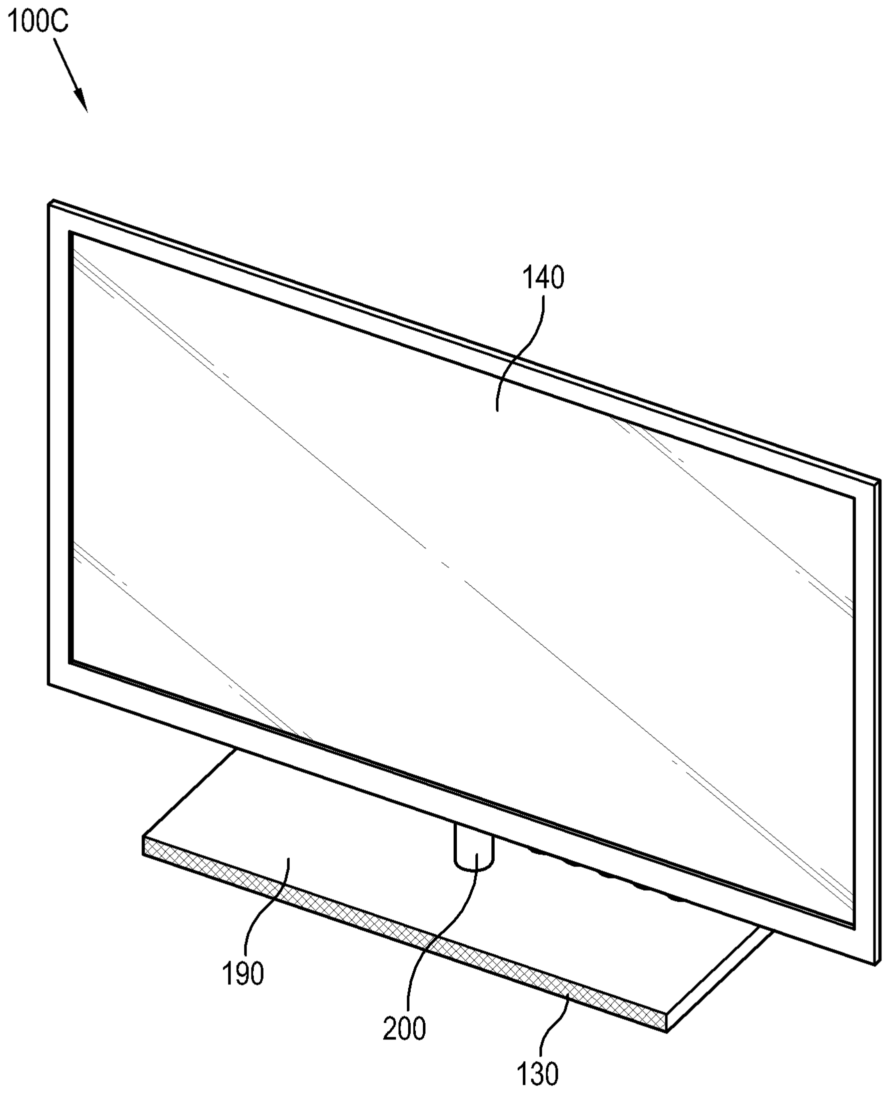
Figure 8:
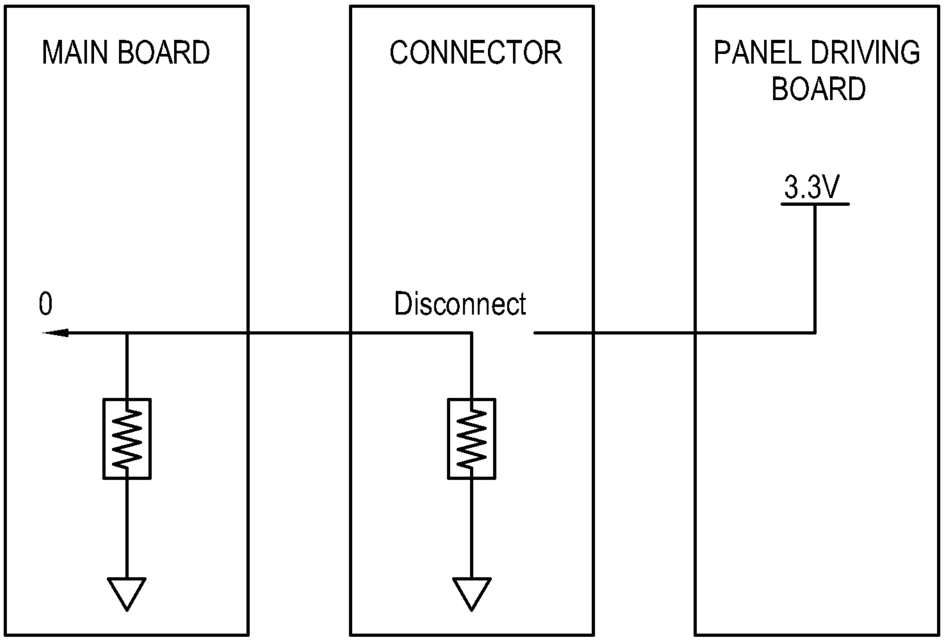

FIGS. 6 to 8 illustrate a display apparatus 100C according to a third exemplary embodiment.

As shown in FIG. 6, in the display apparatus 100C according to the present exemplary embodiment, a display unit 140 including a display panel 151 and a rear chassis 152 having a panel driving board is accommodated in a rear side cover 143.

The display apparatus 100C according to the present exemplary embodiment further include a supporting casing 190 which accommodates therein the receiver 110, the signal processor 120, the speaker 130 and the controller 150 separately from the display unit 140.

The display apparatus 100C according to the present exemplary embodiment may further include a supporter 200 which is supported by the supporting casing 190 and adhered to at least one of the rear side cover 143 and display unit 140 to install the display apparatus 100C on a horizontal surface. The supporting casing 190 may electrically be connected to the display unit 140 through the supporter 200.

The supporter 200 may further include a connector 210 to be electrically connected to the display unit 140 and the supporting casing 190.

The connector 210 may include a first connector 211 which is provided in an upper part of the supporter 200 and connected to the display connector 13 of the display unit 140; and a second connector 212 which is provided in a lower part of the supporter 200 and connected to the supporting connector 191 of the supporting casing 190.

If the display unit 140 and the supporting casing 190 are connected through the supporter 200, an image/audio signal and a control signal may be transmitted to the display unit 140 from the supporting casing 190 through the connector 210 provided in the supporter 200.

An error of physical contact between the supporting connector 191 and the second connector 212 and/or the display connector 13 and the first connector 211 may occur. In such case, the display apparatus 100C according to the present exemplary embodiment may further include a circuit to shut down power supply to thereby prevent malfunction of the display apparatus 100C or damage to circuit components.

The supporting casing 190 is installed through the display unit 140 and the supporter 200 as in FIG. 7.

As shown in FIG. 7, the supporting casing 190 supports the supporter 200 and the upper part of the supporter 200 is coupled to the display unit 140 and stands on the ground.

In this case, the speaker 130 may be provided in a front side of the supporting casing 190.

The controller 150 may control the signal processor 120 to adjust the sound wave to the preset adjustment value stored in the storage unit 160 for the desktop display apparatus 100B and output the adjusted sound wave.

FIG. 8 is a circuit diagram of the display apparatus 100C when the supporting casing 190 is connected to the display unit 140 through the supporter 200.

The controller 150 which is accommodated in the supporting casing 190 may automatically determine the installation condition of the display apparatus 100C.

The supporting connector 191 which is provided in the main board 11 accommodated in the supporting casing 190 and the display connector 13 which is provided in the panel driving board 12 included in the display unit 140 and the connector 210 which is provided in the supporter 190 include a pin (not shown) to identify the installation condition, respectively.

If the supporting connector 191 is connected to the display connector 13 through the connector 210, the first connector 211 is not electrically connected to the display connector 13 and a reference voltage (3.3V) does not flow from the panel driving board 12 to the first connector 211 as in FIG. 8, leading to a failure to flow to the supporting connector 191. Then, a low signal is applied to the controller 150. The controller 150 which receives the low signal may identify that the display apparatus 100C is installed on a horizontal surface. Accordingly, the controller 150 may control the signal processor 120 to adjust the sound signal into the preset adjustment value stored in the storage unit 160 for the desktop display apparatus 100C and output the adjusted audio signal.

Figure 9:
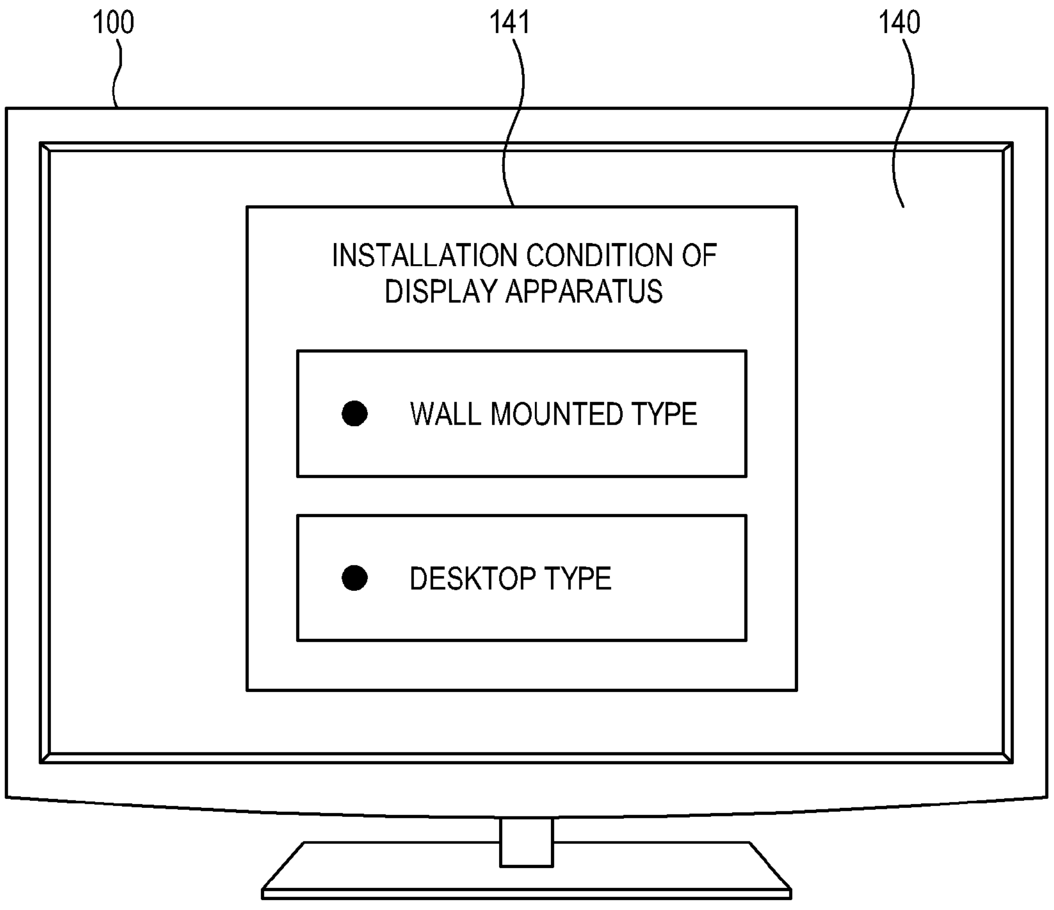
FIG. 9 illustrates a user interface (UI) which displays an installation condition of the display apparatus according to an exemplary embodiment.

FIG. 9 illustrates a UI for a control process of the display apparatus according to an exemplary embodiment.

If a preset signal is received through the user input unit 170, the controller 150 may control the UI generator 180 to generate a UI 141 displaying thereon the installation condition of the display apparatus 100 and display the UI on the display unit 140.

The UI 141 illustrates the type of the display apparatus, i.e., wall-mounted or desktop type. If a user's selection from the UI displayed on the display unit 140 is input through the user input unit 170, the controller 150 may control the signal processor 120 to adjust the sound wave into the preset adjustment value corresponding to the input user's selection and output the adjusted sound wave through the speaker 130.

The selection on the installation condition of the display apparatus 100 through the UI may apply to the display apparatus 100 according to the first, second and third exemplary embodiments.

Figure 10A:
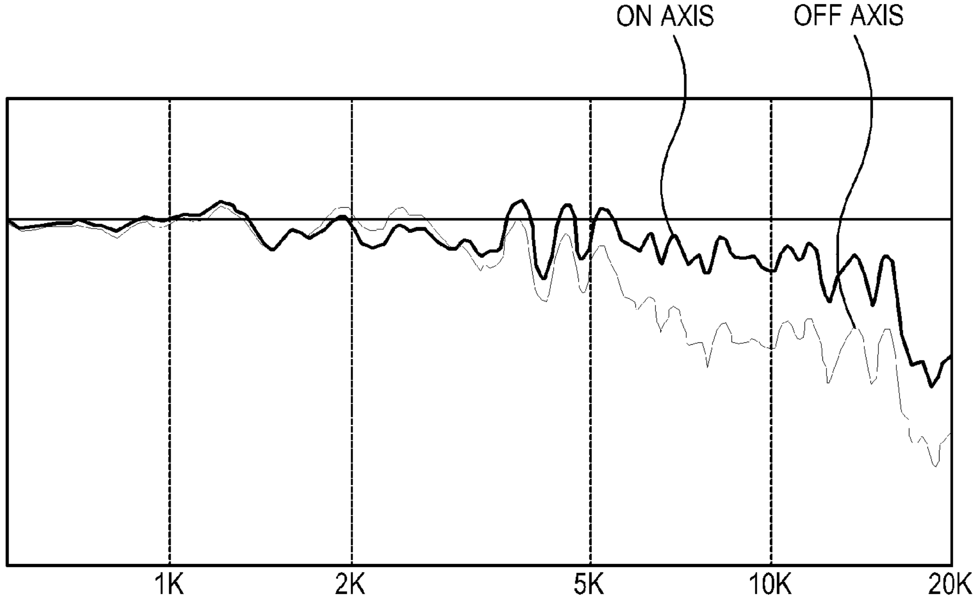
FIGS. 10A and 10B illustrate an effect of adjusting a sound wave of the display apparatus according to an exemplary embodiment.
Figure 10B:

FIGS. 10A and 10B illustrate the effect of the display apparatus 100 according to the first, second and third exemplary embodiments.

FIG. 10A illustrates results of sound pressure level (SPL) in the case when a sound wave output from the speaker 130 is discharged on-axis and off-axis.

According to the SPL results, the sound wave discharged off-axis has attenuation occurring at the medium and high frequencies compared to the sound wave discharged on-axis. The attenuation causes deterioration of sound quality and a listener may recognize it as poor sound quality.

FIG. 10B illustrates the effect of the display apparatus 100 according to the present invention.

The degree of deterioration of sound quality may differ in the case when a wall-mounted or desktop display apparatus is installed. The preset adjustment value is stored in the storage unit 160 to prevent the deterioration of sound quality corresponding to the installation condition.

The controller 150 may determine the installation condition of the display apparatus 100, and control the signal processor 120 to adjust the frequency of the sound signal into the preset adjustment value corresponding to the installation condition and output the adjusted sound wave through the speaker 130.

According to the results of SPL estimation of the sound wave before and after the adjustment by the signal processor 120, attenuation of the medium and high frequencies is adjusted and sound quality becomes close to the original sound. Then, a listener may listen the sound close to the original sound regardless of the installation condition of the display apparatus 100.

Figure 11:
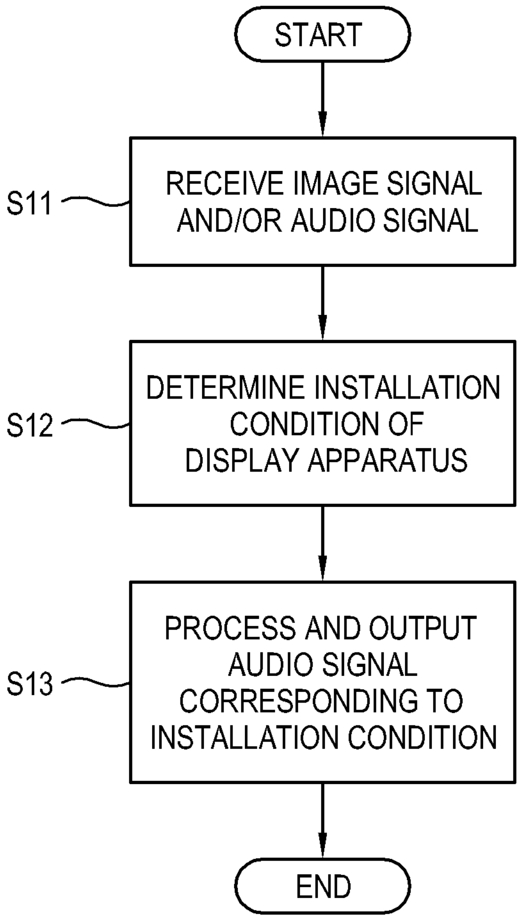
FIG. 11 is a flowchart of a control process of the display apparatus according to according to an exemplary embodiment.

FIG. 11 is a flowchart of a control process of the display apparatus 100 according to an exemplary embodiment.

In the desktop or wall-mounted display apparatus 100, an image and/or audio signal is received from an external source through the receiver 110 (S11). The controller 150 determines the installation condition of the display apparatus (S12), and then controls the signal processor 120 to adjust the sound wave to the preset adjustment value corresponding to the determined installation condition and outputs the adjusted sound wave (S13).

As described above, a display apparatus according to the exemplary embodiments may adjust the sound wave output from the speaker corresponding to an installation condition of the display apparatus. Then, the speaker realizes sound quality close to the original sound without deterioration of sound quality regardless of the installation condition of the display apparatus.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A display apparatus comprising:
- a signal processor configured to process an image signal and an audio signal;
- a display unit configured to display an image corresponding to the image signal processed by the signal processor;
- a speaker on a rear side of the display apparatus, the speaker being configured to output a sound wave corresponding to the audio signal processed by the signal processor;
- a storage unit configured to store predetermined sound adjustment values;
- a user interface (UI) generator configured to generate a UI for a user to select an installation condition of the display unit, the UI being displayed on the display unit, providing a plurality of selection options, for the installation condition selection, including a desktop type and a wall-mounted type;
- a proximity sensor configured to sense a distance between the display apparatus and a wall; and
- a controller configured to:
  - in response to the proximity sensor sensing the distance between the display apparatus and the wall, compare the sensed distance with a preset default, and determine, using the compared result, whether the installation condition of the display apparatus is the desktop type or the wall-mounted type;
  - in response to the installation condition being selected using the UI, determine, using the selected installation condition, whether the installation condition of the display apparatus is the desktop type or the wall-mounted type;
  - control, in response to determining that the installation condition of the display apparatus is the desktop type, the signal processor to adjust the sound wave of the speaker using a predetermined sound adjustment value for the desktop type stored in the storage unit; and
  - control, in response to determining that the installation condition of the display apparatus is the wall-mounted type, the signal processor to adjust the sound wave of the speaker using a predetermined sound adjustment value for the wall-mounted type stored in the storage unit.

2. The display apparatus according to claim 1, wherein the signal processor further comprises a frequency adjuster configured to adjust a frequency of the audio signal based on the adjustment value stored in the storage unit.

3. The display apparatus according to claim 1, wherein the controller is further configured to control the signal processor to adjust a frequency of the audio signal based on the adjustment value stored in the storage unit.

4. The display apparatus according to claim 1, further comprising a user input unit, wherein the controller is further configured to control the signal processor to adjust the sound wave to the adjustment value in response to a signal corresponding to the installation condition of the display apparatus being received through the user input unit.

5. The display apparatus according to claim 1, further comprising:

a user input unit, wherein the controller is further configured to control the signal processor to adjust the sound wave to the adjustment value according to a selection from the displayed UI received through the user input unit.

6. The display apparatus according to claim 1, further comprising a rear side cover configured to accommodate the display unit therein.

7. The display apparatus according to claim 6, wherein the signal processor, the speaker, and the controller are provided in the rear side of the display unit, and accommodated by the rear side cover.

8. The display apparatus according to claim 6, further comprising a supporting casing configured to accommodate therein the signal processor, the speaker and the controller separately from the display unit.

9. The display apparatus according to claim 8, further comprising a supporter configured to be supported by the supporting casing, attached to at least one of the rear side cover and the display unit to install the display apparatus on a horizontal surface, and electrically connected to the supporting casing and the display unit through the supporter.

10. The display apparatus according to claim 8, wherein the supporting casing is configured to detachably connect to an external side of the rear side cover and electrically connect to the display unit to install the display apparatus on a horizontal surface.

11. The display apparatus according to claim 8, wherein the supporting casing comprises a supporting connector configured to be exposed and formed from an external side of the supporting casing and electrically connected to the display unit, and the display unit comprises a display connector configured to be exposed and formed from an external side of the display unit and connected to the supporting connector.

12. The display apparatus according to claim 11, further comprising a supporter configured to be supported by the supporting casing and attached to the display unit, and the supporter comprises a connector configured to connect the supporting connector and the display connector.

13. The display apparatus according to claim 12, wherein the controller is further configured to determine whether the supporting connector is directly connected to the display connector or connected to the display connector through the connector, and to confirm the installation condition of the display apparatus.

14. The display apparatus according to claim 13, wherein, in response to the supporting connector being directly connected to the display connector, a high signal is applied to the controller, and the controller confirms that the display apparatus is installed on a vertical surface.

15. The display apparatus according to claim 13, wherein, in response to the supporting connector being is connected to the display connector through the connector, a low signal is applied to the controller and the controller confirms that the display apparatus is installed on a horizontal surface.

16. A control method of a display apparatus which is installed on a horizontal surface or a vertical surface, the control method comprising:

receiving an image signal and an audio signal at the display apparatus;

generating a UI for a user to select an installation condition of the display apparatus, the UI being displayed on a display unit of the display apparatus and providing a plurality of selection options for the installation condition selection including a desktop type and a wall-mounted type;

receiving through the generated UI a selection corresponding to the installation condition of the display unit;

sensing a distance between the display apparatus and a wall;

comparing the sensed distance between the display apparatus and the wall with a preset default;

determining whether the display apparatus is the desktop type of the wall-mounted type based on the compared result; and adjusting a sound wave of a speaker provided on a rear side of the display apparatus using a predetermined sound adjustment value according to the determined result, wherein in response to the display apparatus being determined to be the desktop type, the sound wave of the speaker is adjusted using a predetermined sound adjustment value for the desktop type, and in response to the display apparatus being determined to be the wall-mounted type, the sound wave of the speaker is adjusted using a predetermined sound adjustment value for the wall-mounted type; and outputting the adjusted sound wave.

17. The control method according to claim 16, wherein the predetermined sound adjustment value for the desktop type and the predetermined sound adjustment value for the wall-mounted type are pre-stored in the display apparatus.

18. The control method according to claim 16, further comprising confirming reception of a signal corresponding to the installation condition of the display apparatus through a user input unit.

19. The control method according to claim 18, wherein the UI displays the installation condition of the display apparatus, and wherein the selection corresponding to the installation condition of the display unit is received through the user input unit.

* * * * *